United States Patent
Barton et al.

(10) Patent No.: US 11,252,577 B2
(45) Date of Patent: Feb. 15, 2022

(54) ASSOCIATION-RULES BASED ON BSS- AND AFFINITY-COLORING

(71) Applicant: Cisco Technology, Inc., San Jose, CA (US)

(72) Inventors: Robert E. Barton, Richmond (CA); Vishal S. Desai, San Jose, CA (US); Jerome Henry, Pittsboro, NC (US)

(73) Assignee: Cisco Technology, Inc., San Jose, CA (US)

(*) Notice: Subject to any disclaimer, the term of this patent is extended or adjusted under 35 U.S.C. 154(b) by 131 days.

(21) Appl. No.: 16/810,602

(22) Filed: Mar. 5, 2020

(65) Prior Publication Data

US 2021/0282020 A1 Sep. 9, 2021

(51) Int. Cl.
*H04W 16/14* (2009.01)
*H04W 72/04* (2009.01)
(Continued)

(52) U.S. Cl.
CPC ........... *H04W 16/14* (2013.01); *H04W 16/10* (2013.01); *H04W 28/24* (2013.01);
(Continued)

(58) Field of Classification Search
CPC ............. H04W 16/14; H04W 72/0453; H04W 72/0446; H04W 72/0406; H04W 16/10;
(Continued)

(56) References Cited

U.S. PATENT DOCUMENTS 10,159,010 B1* 12/2018 Smith .................... H04W 28/24
10,268,474 B2* 4/2019 Stammers ................. G06F 8/65
(Continued)

FOREIGN PATENT DOCUMENTS

| CN | 108141756 A | 6/2018 |
| KR | 20180121420 A | 11/2018 |
| WO | 2017074486 A1 | 5/2017 |

OTHER PUBLICATIONS https://arxiv.org/abs/2101.12644; Jan. 2021, "5G Network Slicing for Wi-Fi Networks", Matteo Nerini, David Palma, 17th IFIP/IEEE International Symposium on Integrated Network Management (IM 2021), pp. 1-3 (Year: 2021).*

(Continued)

*Primary Examiner* — Hassan Kizou
*Assistant Examiner* — Abdullahi Ahmed
(74) *Attorney, Agent, or Firm* — Patterson + Sheridan, LLP

(57) ABSTRACT

Embodiments herein describe mirroring slices in a 5G domain (or network) in a Wi-Fi domain (or network). A slice in a 5G domain allows a service provider to establish a separate network within the 5G network which can have a different minimum bandwidth, minimum latency, a quality of service (QoS) level, a certain application must be proximate to the client devices, and a service level agreement (SLA) relative to the other slices. The embodiments herein can mirror the traffic isolation and flexibility of 5G slices in a Wi-Fi network by using resource units (RUs). The AP can assign RUs in a manner to match the bandwidth and latency of the corresponding 5G slice. Further, the AP controls (Continued)

which client devices can use the RUs and can ensure that only the client devices that can use the same 5G slice can use the same RUs.

20 Claims, 5 Drawing Sheets

(51) Int. Cl.
*H04W 16/10* (2009.01)
*H04W 48/16* (2009.01)
*H04W 48/10* (2009.01)
*H04W 40/24* (2009.01)
*H04W 28/24* (2009.01)
*H04W 88/08* (2009.01)

(52) U.S. Cl.
CPC ......... *H04W 40/244* (2013.01); *H04W 48/10* (2013.01); *H04W 48/16* (2013.01); *H04W 72/0406* (2013.01); *H04W 72/0446* (2013.01); *H04W 72/0453* (2013.01); *H04W 88/08* (2013.01)

(58) Field of Classification Search
CPC ... H04W 48/16; H04W 48/10; H04W 40/244; H04W 28/24; H04W 88/08
See application file for complete search history.

(56) References Cited

U.S. PATENT DOCUMENTS

| | | |
|---|---|---|
| 2017/0164212 A1 | 6/2017 | Opsenica et al. |
| 2017/0359735 A1* | 12/2017 | Jain ........................ H04W 24/10 |
| 2019/0246293 A1* | 8/2019 | Halabian ................ H04W 72/10 |
| 2019/0372853 A1 | 12/2019 | Bainbridge et al. |
| 2020/0059460 A1* | 2/2020 | Orr ........................ H04L 12/185 |
| 2020/0260462 A1* | 8/2020 | Elad ..................... H04W 52/367 |
| 2021/0143955 A1* | 5/2021 | Yang ..................... H04L 5/0048 |
| 2021/0185540 A1* | 6/2021 | Gundavelli ............. H04W 4/60 |

OTHER PUBLICATIONS

Joan Josep Aleixendri, August Betzler, and Daniel Camps-Mur, "A Practical Approach To Slicing Wi-Fi Rans in Future 5G Networks," 2019, IEEE Wireless Communications and Networking Confrerence, 23 pages.

Mukesh Taneja, "Network Segmentation and Slicing: Methods for Network Slicing in 802.11AX-Type of Systems in 5G Networks," ip.com Disclsoure No. IPCOM000250415D, Publication Date Jul. 12, 2017 (Abstract Only).

* cited by examiner

ASSOCIATION-RULES BASED ON BSS- AND AFFINITY-COLORING

TECHNICAL FIELD

Embodiments presented in this disclosure generally relate to mirroring 5G slices in a Wi-Fi network.

BACKGROUND 5G establishes networks, within which user equipment (UE) connect with a particular service level agreement (SLA) that matches a slice. That is, 5G networks feature the ability to create slices that not only allow segmentation of wireless resources, but also provide a new host of features for cellular networks. However, many cellular carriers also support public Wi-Fi services but 5G slices cannot easily be integrated with Wi-Fi networks. One approach has been to create multiple service set identifiers (SSIDs) on the service provider's Wi-Fi access points and tie these SSIDs back to the 5G slices. However, this has a significant drawback since multiple SSIDs create overhead on the AP, requiring each SSID to issue management beacons, etc. Typically, an AP radio can support only 4 to 5 SSIDs before the overhead associated with those SSIDs begins to negatively affect the performance of the AP. Even ignoring the performance issues associated with SSID overhead, there is a scalability issue where an AP radio can support a fixed number of SSIDs (e.g., a maximum of 16 SSIDs).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes establishing a Wi-Fi slice that mirrors a 5G slice in an AP, advertising the Wi-Fi slice to roaming client devices, determining that a 5G enabled client device has associated with a basic service set (BSS) corresponding to the Wi-Fi slice, and assigning a predetermined number of resource units (RUs) corresponding to the Wi-Fi slice to the 5G enabled client device.

Another embodiment described herein is an AP that includes a processor and memory storing a program which, when executed by the processor, performs an operation. The operation includes establishing a Wi-Fi slice that mirrors a 5G slice in an AP, advertising the Wi-Fi slice to roaming client devices, determining that a 5G enabled client device has associated with a BSS corresponding to the Wi-Fi slice, and assigning a predetermined number of RUs corresponding to the Wi-Fi slice to the 5G enabled client device.

EXAMPLE EMBODIMENTS

Embodiments herein describe mirroring slices of a 5G domain (or network) in a Wi-Fi domain (or network). A slice in a 5G domain allows a service provider to establish a separate network within the 5G network. A slice can specify a minimum bandwidth, minimum latency, a quality of service (QoS) level, that a certain application must be proximate to the client devices, that a service level agreement (SLA) must be satisfied, and the like. Thus, client devices connected to the same 5G network can have much different resources at their disposal depending on which slice they join.

While configuring SSIDs to have similar characteristics as 5G slices enables a Wi-Fi network to mirror the traffic isolation and flexibility provided by a 5G network, as mentioned above, establishing a one-to-one relationship between SSIDs and 5G slices generates overhead that can affect AP performance and can fail to scale if the number of 5G slices is greater than the maximum number of SSIDs the AP can support. Instead, the embodiments herein mirror the traffic isolation and flexibility of 5G slices in a Wi-Fi network by using resource units (RUs). A RU is a unit introduced in IEEE 802.11ax WLAN to denote a group of subcarriers (tones) in a frequency channel and over a time unit (transmit opportunity). The RUs permit an AP to divide bandwidth among client devices. The AP can assign RUs in a manner to match the bandwidth and latency of the corresponding 5G slice. Further, the AP controls which client devices can use the RUs and can ensure that only the client devices permitted to use the same 5G slice can also use the same Wi-Fi slice. Thus, assigning RUs to establish Wi-Fi slices can provide traffic isolation and match the performance characteristics of 5G slices without assigning an SSID to each 5G slice.

Figure 1:
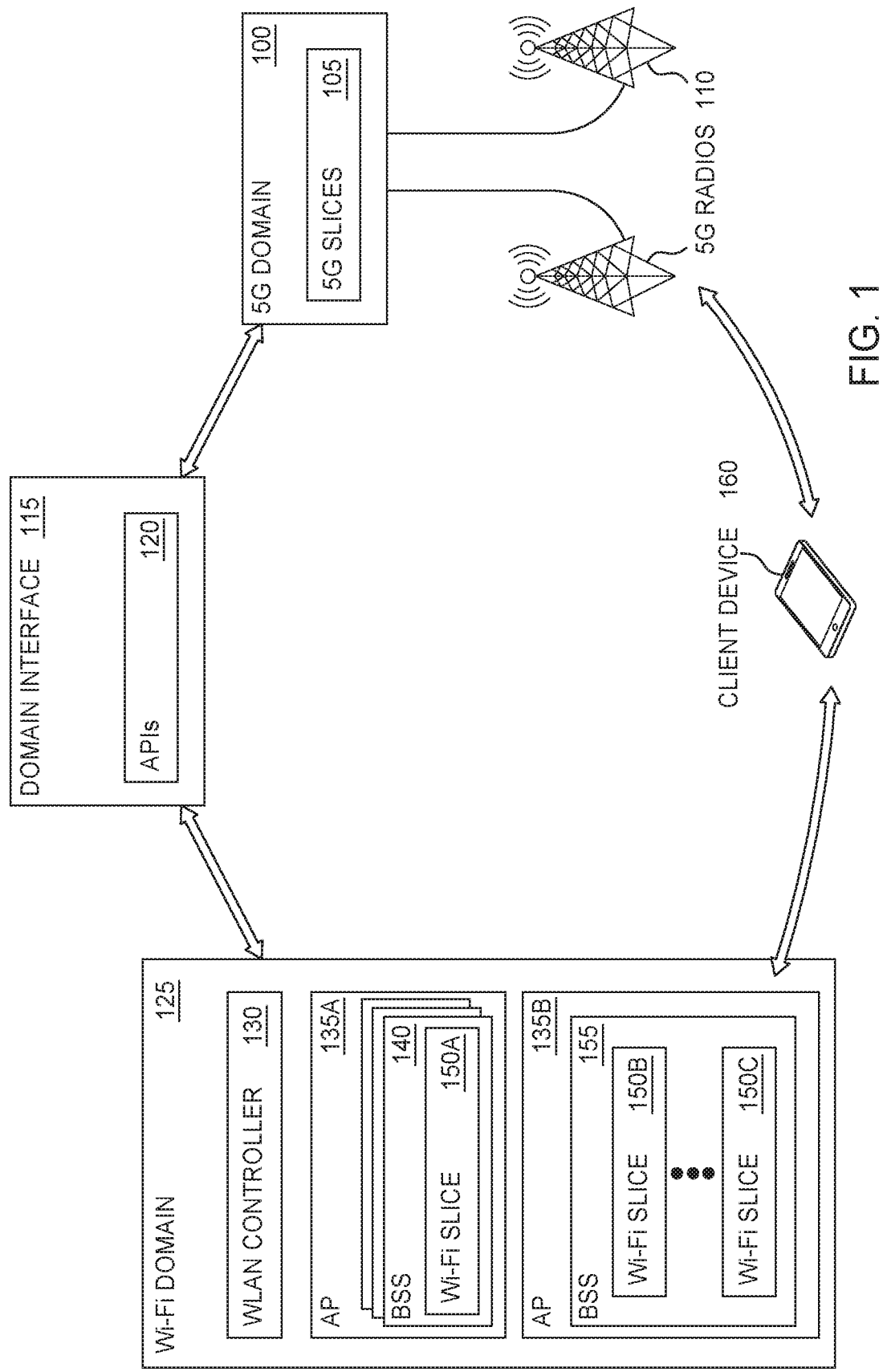
FIG. 1 illustrates a Wi-Fi domain with Wi-Fi slices that mirror slices in a 5G domain, according to one embodiment.

FIG. 1 illustrates a Wi-Fi domain 125 with Wi-Fi slices 150 that mirror 5G slices 105 in a 5G domain 100, according to one embodiment. As shown, FIG. 1 includes a 5G domain (or network) 100 that has one or more 5G slices 105. Each slice 105 can be considered as a separate network (e.g., a sub-network within the 5G network) where the traffic is isolated. Further, the 5G domain 100 can establish different characteristics for each of the 5G slices 105 such as different latency requirements, bandwidth allocations, QoS, etc. For example, internet of things (IoT) devices may require much less bandwidth than autonomous vehicles. The 5G domain can define a 5G slice 105 for IoT devices which provides less bandwidth than a 5G slice 105 used by autonomous vehicles. Thus, even though these client devices use the same 5G radios 110 and connect to the same 5G network, being part of different 5G slices 105 within that network means the client devices can have different network resources assigned to them (e.g., different minimum bandwidth, maximum latency, QoS level, applications, a SLA, etc.).

FIG. 1 illustrates a client device 160 roaming from the 5G domain 100 to the Wi-Fi domain 125. For example, the client device 160 may be an autonomous vehicle that moves from an area covered by the 5G radios 110 (e.g., a public street) to an area better covered by APs 135 in the Wi-Fi domain 125 (e.g., a parking garage). Or the client device 160 may be a mobile phone or tablet that moves from a coverage area provided by the 5G radios 110 into a building covered by the APs 135. While the client device 160 is shown as moving, in other examples the client device 160 may be stationary (such as a mounted IoT sensor) that uses the Wi-Fi domain 125 as a backup when the 5G domain 100 is unavailable (e.g., a failover situation). In general, the client device 160 can be any device that is compatible with 5G and Wi-Fi standards (e.g., dual 5G and Wi-Fi devices). In one embodiment, the 5G domain 100 and the Wi-Fi domain 125 support OpenRoaming which permits the client device 160 to use the same credentials to access both the 5G and Wi-Fi networks.

The service provider of the 5G domain 100 may want to provide the same level of service and data isolation established by the 5G slices 105 in the 5G domain 100 as in the Wi-Fi domain 125. Thus, the service provider may instruct the Wi-Fi domain 125 to establish Wi-Fi slices 150 that mirror the performance characteristics of the 5G slices 105. To do so, FIG. 1 includes a domain interface 115 that permits communication between the 5G domain 100 and the Wi-Fi domain 125. The domain interface 115 includes one or more application programming interfaces (APIs) 120 that the domains 100, 125 can use to share data. In one embodiment, the APIs 120 establish a framework that can be configured so that the domains 100, 125 can transfer data.

In one embodiment, the 5G domain 100 uses the APIs 120 to inform the Wi-Fi domain 125 about the 5G slices 105. That is, the 5G domain 100 may tell the Wi-Fi domain 125 the number of 5G slices 105, the performance characteristics of each 5G slice 105 (e.g., the latency and bandwidth requirements), as well as the client devices permitted to use the 5G slice 105 (e.g., some types of client devices 160 can access a slice 105, or only client devices 160 that have special log in credentials can access the slice 105). As a result, the Wi-Fi domain 125 knows the characteristics of the 5G slices 105 as well as the client devices 160 permitted to use those slices 105.

The Wi-Fi domain 125 includes a WLAN controller 130 that can instruct the APs 135 to establish Wi-Fi slices 150 corresponding to the 5G slices 105. When associating with one of the APs 135, the roaming client device 160 can select the Wi-Fi slice 150 that corresponds to the 5G slice 105 the device 160 was using when connected to the network established by the 5G domain 100. As discussed in more detail below, the APs 135 can provide data isolation (similar to the data isolation supported by the 5G slices 105) by assigning RUs to each of the Wi-Fi slices 150. Moreover, by selecting the number of RUs assigned to each Wi-Fi slice 150, the APs can also configure the Wi-Fi slices 150 to have similar performance characteristics as the corresponding 5G slices 105 (e.g., similar latency and bandwidth).

Figure 3:
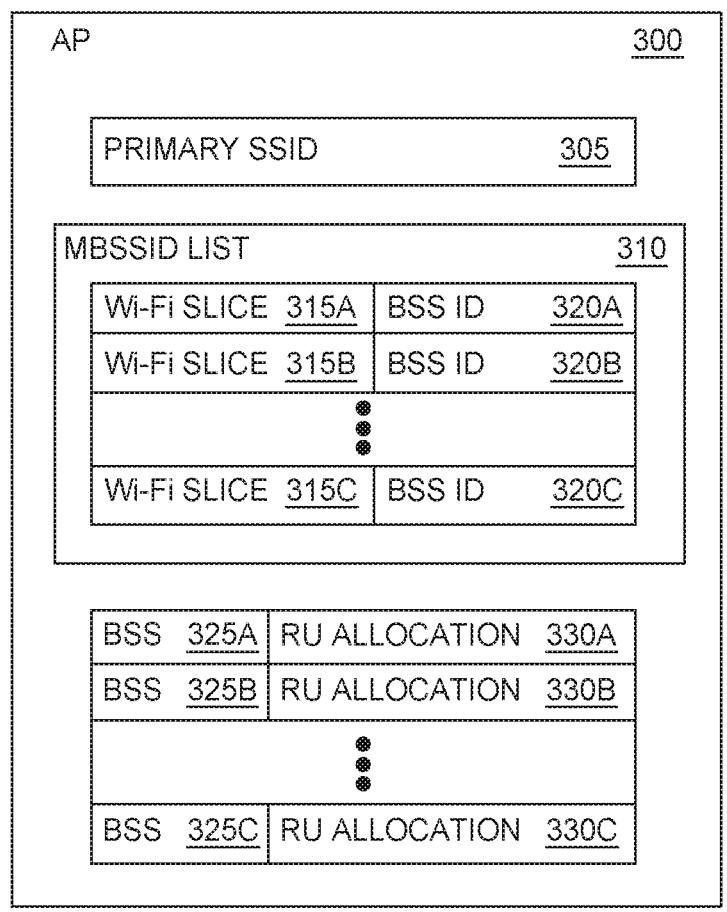
FIG. 3 illustrates an AP that advertises Wi-Fi slices using a MBSSID list, according to one embodiment.

FIG. 1 illustrates two different embodiments for establishing the Wi-Fi slices 150 in the APs 135. In the first embodiment, the AP 135A includes multiple basic service sets (BSSs) 140 that each correspond to an equivalent 5G slice 105 in the 5G domain. The BSSs 140 each correspond to a Wi-Fi slice 150A, thereby mapping each of the Wi-Fi slices 150A to one of the 5G slices 105. That is, the AP 135A has one BSS 140 for each Wi-Fi slice 150A. As described in more detail below, the AP 135A can advertise these BSSs 140 to the client device 160 which can then choose the BSS 140 supporting a Wi-Fi slice 150A matching the 5G slice 105 the device 160 used in the 5G domain 100. Advantageously, the BSSs 140 can be advertised without adding any additional SSIDs. That is, when the WLAN controller 130 instructs the AP 135A to establish a Wi-Fi slice 150, the AP 135A can add a new BSS 140 without adding a new SSID. The details of this embodiment are illustrated in FIG. 3.

Figure 5:
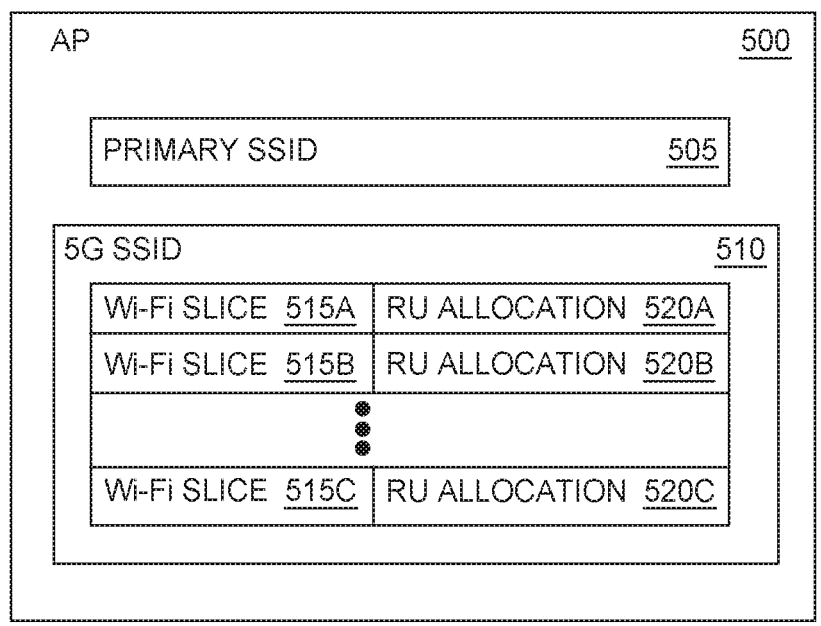
FIG. 5 illustrates an AP that advertises Wi-Fi slices using a specialized 5G SSID, according to one embodiment.

In the second embodiment, the AP 135B includes a BSS 155 supporting multiple Wi-Fi slices 150. In one embodiment, the BSS 155 corresponds to a SSID. That is, rather than establish a new SSID for each 5G slice 105, the AP 135B establishes just one new SSID and corresponding BSS 155 which can support multiple Wi-Fi slices 150. Thus, while the AP 135B does have the overhead associated with managing a new SSID, only one SSID can be added to support multiple Wi-Fi slices 150, and thus, the second embodiment can scale like the first embodiment. Once the roaming client device 160 connects to the BSS 155 (using the new SSID), the AP 135B can identify which Wi-Fi slice 150 corresponds to the 5G slice 105 used by the client device 160 when in the 5G domain 100 and assign RUs accordingly. The details of this embodiment are illustrated in FIG. 5.

Although not shown, the APs 135 can include various hardware and software components for performing the techniques described herein. For example, the APs 135 may include one or more processors and memory for storing and executing a software program.

Figure 2:
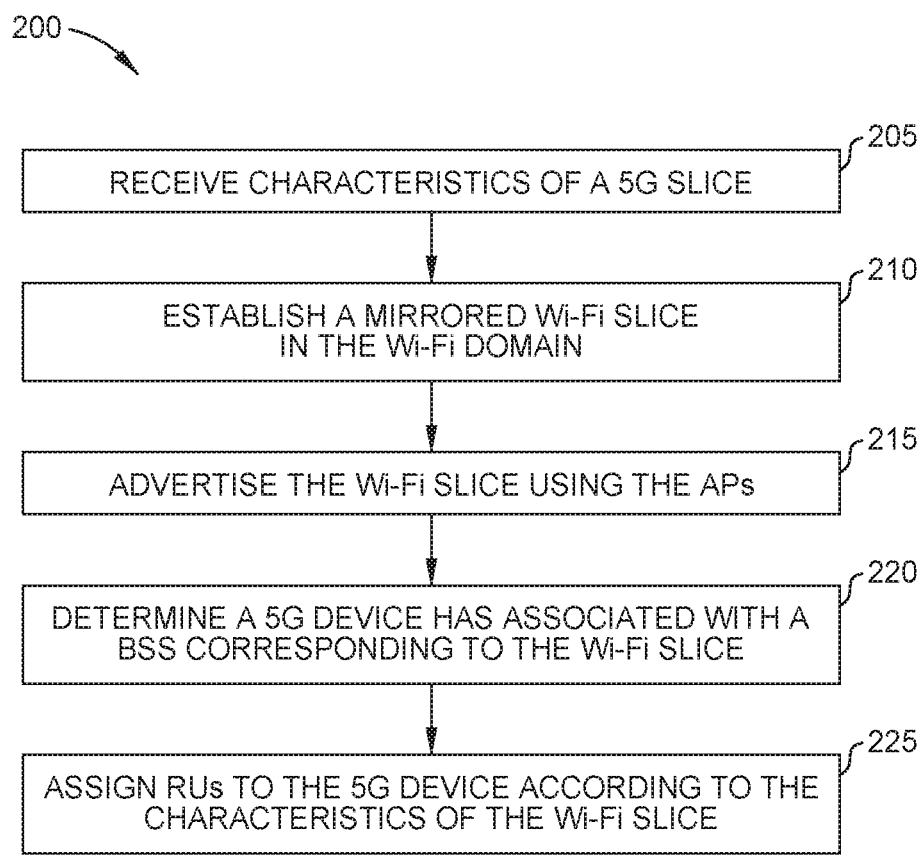
FIG. 2 is a flowchart for using resource units to mirror a performance of a 5G slice in a Wi-Fi network, according to one embodiment.

FIG. 2 is a flowchart of a method 200 for using RUs to mirror a performance of a 5G slice in a Wi-Fi network, according to one embodiment. At block 205, the WLAN controller in the Wi-Fi domain receives characteristics of a 5G slice. That is, referring to FIG. 1, the 5G domain 100 can use the domain interface 115 to provide the performance characteristics of the 5G slices 105 to the WLAN controller 130 in the Wi-Fi domain 125. For example, each time the 5G domain adds or updates a 5G slice, the 5G domains sends the new or updated performance characteristics of the 5G slice to the WLAN controller.

In addition to receiving the performance characteristics, the 5G domain may also transmit the IDs of the client devices permitted to access each 5G slice. If applicable, the 5G domain may also transmit login credentials associated with the 5G slices. With this information, the WLAN controller can determine which roaming client device can access the corresponding Wi-Fi slices, thus maintaining the same security standards used in the 5G domain to ensure traffic isolation.

At block 210, the WLAN controller instructs the APs to create a mirrored Wi-Fi slice in the Wi-Fi domain. For example, the WLAN controller may use the performance characteristics to determine how many RUs are assigned to each mirrored Wi-Fi slice so that the performance of the Wi-Fi slice substantially matches the performance of the 5G slice. Further, the WLAN controller can inform the APs of the IDs of the client devices (and the log in credentials) that are permitted to use the Wi-Fi slice.

At block 215, the APs advertise the Wi-Fi slice. In one embodiment, the Wi-Fi slice is established on each AP in the Wi-Fi domain. However, because these is little to no overhead corresponding to those slices, establishing the slice on all the APs will likely not affect their performance. That is, at this point, the Wi-Fi slices are essentially virtual constructs that define the number of RUs assigned to the slices as well as the client devices permitted to use the Wi-Fi slices. The Wi-Fi slices may each be assigned their own BSSs (as shown in by the AP 135A) or multiple Wi-Fi slices may be assigned to the same BSS (as shown in the AP 135B). There may be some additional overhead if the latter embodiment is used since a new SSID may be created in the APs to be used by the roaming client devices. However, this overhead occurs only once when the first Wi-Fi slice is created in the Wi-Fi domain. As other Wi-Fi slices are created, the overhead does not increase.

Further, advertising the Wi-Fi slices requires little additional bandwidth from the APs. In one embodiment, the Wi-Fi slices are advertised using beacons or probe responses for an existing SSID. As discussed in FIG. 3, information regarding the Wi-Fi slices can be embedded within the beacons or probe responses (e.g., within a field of the header in the beacon or probe response). Alternatively, the APs can advertise a SSID that roaming 5G client devices should use, regardless of the particular 5G slices the client devices used when connected to the 5G network. Once connected the SSID, the AP can determine which Wi-Fi slice corresponds to which client device. The details of advertising the Wi-Fi slices using a common SSID are discussed in FIG. 5.

At block 220, the APs determines that a roaming 5G client device has associated with a BSS corresponding to the Wi-Fi slice. In one embodiment, the APs use an ID associated with the client devices (e.g., a MAC address or other identifying information) to determine the client device is a roaming 5G client device and that the client device can use one of the Wi-Fi slices. For example, the AP may determine using the ID the client device is a 5G autonomous vehicle and determine which Wi-Fi slice corresponds to the 5G slice used by the autonomous vehicle when connected to the 5G network.

At block 225, the APs assign RUs to the 5G roaming client device according to the characteristics of the Wi-Fi slice. For example, more RUs may be assigned to Wi-Fi slices corresponding to 5G slices that have higher bandwidth guarantees (or lower latency guarantees) than Wi-Fi slices corresponding to 5G slices with lower bandwidth or higher latency guarantees. The Wi-Fi slice assigned to the roaming 5G client device determines the number of RUs assigned to the client device once it has connected to the BSS. During a negotiation phase, the AP can assign the RUS corresponding to the Wi-Fi slice to the client device.

In one embodiment, the performance characteristics of the RUs in a Wi-Fi slice provide generally the same performance as the 5G slices (or a relative performance compared to the other Wi-Fi slices and their corresponding 5G slices). In this manner, roaming client devices can benefit from the same or similar data isolation and performance when connected to the Wi-Fi network as when connected to the 5G network.

FIG. 3 illustrates an AP 300 that advertises Wi-Fi slices 315 using a Multiple Basic Service Set Identifier (MBSSID) list 310, according to one embodiment. The AP 300 includes a primary SSID 305, which can also be referred to as an original SSID. For example, the AP 300 may have included the primary SSID 305 before the AP 300 was configured to include any of the Wi-Fi slices 315. That is, in this example, the AP 300 did not provision a new SSID when establishing the Wi-Fi Slices 315. Instead, the Wi-Fi slices 315 can be advertised using the beacons and the probe response associated with the primary (or original) SSID 305. Thus, as discussed above, adding Wi-Fi slices 315 in the AP 300 does not increase overhead since the slices 315 can be advertised using existing SSID(s)—e.g., the primary SSID 305. In one embodiment, the AP 300 is one example of the AP 135A illustrated in FIG. 1.

The MBSSID list 310 includes multiple Wi-Fi slices 315 which have corresponding BSS IDs 320. That is, each Wi-Fi slice 315 includes a corresponding BSS ID 320. In one embodiment, the MBSSID list 310 is embedded in a field of the beacon corresponding to the primary SSID 305. That is, when transmitting beacons advertising the SSID 305, the data in the MBSSID list 310 can be embedded in the beacon so that any roaming client devices receives the MBSSID list 310. Put differently, the embedded MBSSID list 310 can advertise the Wi-Fi slices (as discussed at block 215 of the method 200). Previously, a MBSSID list was used to indicate the type of services supported by the SSID 305. However, in this embodiment, the MBSSID list 310 is repurposed to instead advertise the Wi-Fi slices 315 supported by the AP 300. In one embodiment, each beacon transmitted by the AP 300 includes the MBSSID list 310. However, in another embodiment, the MBSSID list 310 may be transmitted selectively—e.g., after the AP determines a roaming client device is 5G device.

When a roaming 5G client device receives the MBSSID list 310, the device can evaluate the Wi-Fi slices 315 to determine whether one of those slices 315 corresponds to the 5G slice used by the client device when connected to the 5G network. For example, the Wi-Fi slices 315 may have the same name or similar description as the 5G slices. Thus, the client devices can determine which Wi-Fi slice 315 corresponds to the 5G slice it used in the 5G network. However, the Wi-Fi domain can use other techniques for indicating to the 5G client device which Wi-Fi slice 315 it should select. That is, because the 5G domain can communicate with the Wi-Fi domain, the 5G domain can provide any ID to the Wi-Fi domain that the 5G client devices can use (when that ID is included in the MBSSID list 310) to determine which Wi-Fi slice 315 to select. Moreover, other techniques can be used to indicate to a client device which Wi-Fi slice it should use. For example, the AP can use 802.11u ANQP messages to selectively advertise to a new client the realm of a service provider. For instance, only one BSSID in the Wi-Fi network advertises the service provider's realm, thereby indicating to the client device (which knows its service provide) which BSS it should connect to.

Once the 5G client device selects a Wi-Fi slice 315, it can use the corresponding BSS ID 320 to associate with the AP 300. For example, if the Wi-Fi slice 315A corresponds to the 5G slice used by the client device, then the client device uses the BSS ID 320A to associate to the AP 300. Thus, each Wi-Fi slice 315 can correspond to a unique BSS ID 320 for associating with the AP 300.

In one embodiment, the BSS IDs 320 are MAC addresses of the AP 300 which correspond to the BSSs 325. However, the BSS IDs 320 can be any connection information such as a virtual label that is tied to the Wi-Fi slices 315. In one embodiment, the Wi-Fi slices 315 can be considered as SSIDs that are being advertised within the SSID 305 (using the MBSSID list). However, the Wi-Fi slices 315 are never established as actual SSIDs, and thus, do not incur the overhead (e.g., transmitting beacons, responding to probes, transmitting management frames, etc.) that is associated with the SSID 305. Thus, the primary SSID 305 (a physical SSID) can be used to advertise a full list of Wi-Fi slices 315, which function similar to a physical SSID but without the overhead.

Once the 5G client device identifies the correct BSS ID 320, the device can use the ID 320 to associate to the AP 300.

Here, each BSS ID 320 corresponds to one of the BSSs 325—e.g., BSSs 325A-C. The AP 300 can then validate the client device—i.e., ensure the client device is permitted to use the Wi-Fi slice 315 (e.g., block 220 in the method 200). For example, the AP 300 may use an ID associated with the client device, or request login credentials from the client device, to determine whether the client device can join the BSS 325 of the Wi-Fi slice 315.

Once the association process completes, the AP 300 can then use the RU allocation corresponding to each BSS 325 (or, more specifically, to each Wi-Fi slice 315) to assign RUs to the client device (e.g., block 225 in the method 200). The RU allocations 330 can be different for each BSS 325. As mentioned above, the number of RUs in each allocation 330 may depend on the performance characteristics of the corresponding 5G slice. Further, the RU allocations 330 may correspond to different RUs (e.g., non-overlapping RUs) so that the data transmitted by client devices in different Wi-Fi slices are isolated from each other. However, the client devices in the same Wi-Fi slice may be assigned the same RUs. But the AP 300 may increase the number of RUs in the RU allocation 330 according to a SLA as more client devices join the BSS 325 of a particular Wi-Fi slice 315. Further, as the performance characteristics of the 5G slices change, the WLAN controller can instruct the AP 300 to change the RU allocations 330 accordingly.

Figure 4:
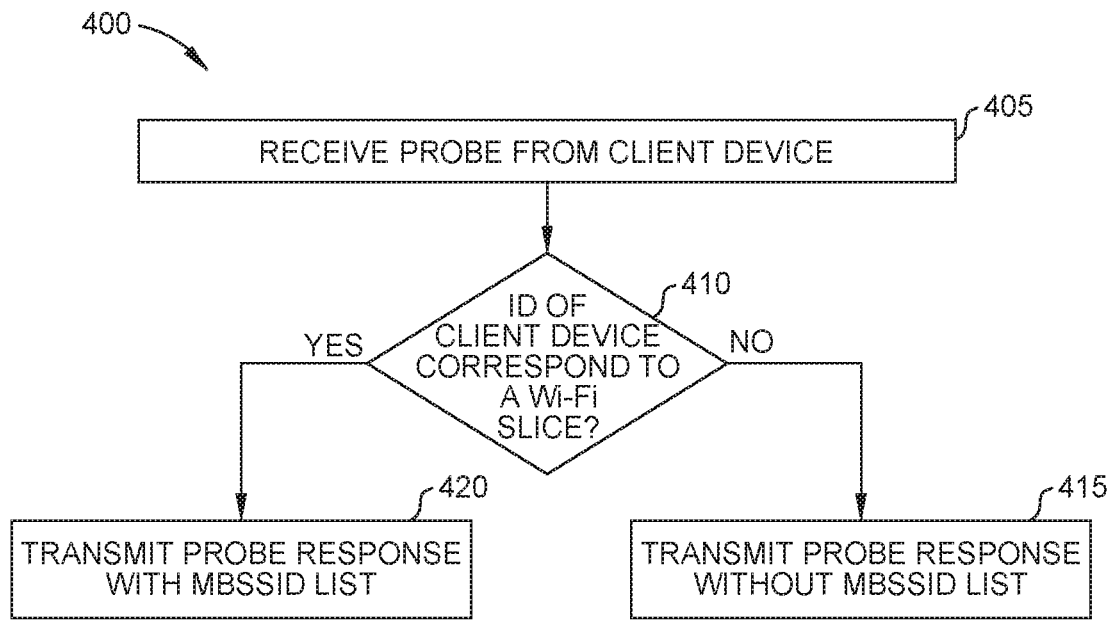
FIG. 4 is a flowchart for transmitting a MBSSID list in response to a probe from a 5G device, according to one embodiment.

FIG. 4 is a flowchart of a method 400 for transmitting a MBSSID list in response to a probe from a 5G device, according to one embodiment. While the AP can transmit the MBSSID list in each beacon sent advertising an SSID, this increases the bandwidth used by the beacons (since the beacons have more information—i.e., the MBSSID lists). Method 400 illustrates techniques for reducing the amount of bandwidth used when advertising the Wi-Fi slices using the MBSSID list.

At block 405, the AP receives a probe from a client device. At block 410, the AP determines whether the ID of the client device corresponds to a Wi-Fi slice. That is, the AP can use information in the probe from the client device (e.g., the ID of the client device) to determine whether the client device is a 5G device and whether it uses a 5G slice when connected to the 5G network. While block 410 illustrates using an ID of the client device, any identifying information can be used so long as it enables the AP to determine whether the roaming 5G client device is assigned to a 5G slice.

If the client device is associated with a 5G slice (and a corresponding Wi-Fi slice is established on the AP), the method 400 proceeds to block 420 where the AP transmits a probe response to the client device that includes the MBSSID list. Otherwise, the method 400 proceeds to block 415 where the AP transmits a probe response that does not include the MBSSID list—e.g., a typical or normal probe response. In this manner, the method 400 enables the APs to send the MBSSID list to the client devices it knows are associated with 5G slices. As mentioned above, the 5G domain can transmit a list of the 5G slices as well as the client devices associated with those slices to the Wi-Fi domain. Thus, the AP can potentially save bandwidth by transmitting the MBSSID list to a client device after the AP has determined the client device should use one of the Wi-Fi slices, rather than always transmitting the MBSSID list regardless whether a client device is associated with a 5G slice.

FIG. 5 illustrates an AP that advertises Wi-Fi slices using a specialized 5G SSID, according to one embodiment. The AP 500 includes a primary SSID 505, which can also be referred to as an original SSID. For example, the AP 500 may have included the primary SSID 505 before the AP 500 was configured to include any of the Wi-Fi slices 515.

In this example, in contrast to the AP 300 in FIG. 3, the AP 500 provisions a new SSID (i.e., 5G SSID 510) when establishing the Wi-Fi Slices 515. As shown, the 5G SSID 510 corresponds to multiple Wi-Fi slices 515. For example, the first time the WLAN controller instructs the AP 500 to establish a Wi-Fi slice 515, the AP 500 may generate a new 5G SSID 510 and begin sending out beacons and other maintenance frames, the same as the primary SSID 505. However, it is not necessary to wait until a Wi-Fi slice 515 is established before provisioning the 5G SSID 510. That is, the AP 500 may have the 5G SSID 510 even before the WLAN controller instructs the AP 500 to establish a Wi-Fi slice 515, although it may be advantageous to wait since the AP 500 would avoid the overhead associated with the 5G SSID 510. In one embodiment, the AP 500 is one example of the AP 135B illustrated in FIG. 1.

While the AP 500 generates additional overhead relative to the AP 300 since it has one additional SSID, the AP 500 avoids having to add the MBSSID list to the beacons or probe response of the primary SSID 505. Instead, the AP 500 advertises that it has Wi-Fi slices using the 5G SSID 510. That is, as 5G client devices roam, they can receive the beacons corresponding to the 5G SSID 510 and know the AP 500 potentially has a Wi-Fi slice 515 corresponding to their 5G slice. That is, the client devices can be programmed to know that an AP advertising a SSID labeled "5G" (or some other predefined name or description) has established Wi-Fi slices 515. That is, the AP 500 uses the beacons of the 5G SSID 510 to advertise the Wi-Fi slices 515 as discussed at block 215 in the method 200.

Once a roaming 5G client device associates to the BSS corresponding to the 5G SSID 510, the AP 500 can then perform blocks 220 and 225 of the method 200. For example, the AP 500 can identify the client device, e.g., using information provided by the client device to determine which Wi-Fi slice 515 the client device is permitted to use. Like above, each Wi-Fi slice 515 is associated with a RU allocation 520 which may provide performance characteristics that are similar to the 5G slices in the 5G network. The RU allocations 520 for each Wi-Fi slice 515 may be the same or different. Further, the AP 500 can update the RU allocations 520 dynamically as instructed by the WLAN controller to, e.g., mirror changes to the corresponding 5G slices or to satisfy a SLA.

In this example, the Wi-Fi slices are in the same BSS—i.e., the BSS corresponding to the 5G SSID 510. As client devices associate to the 5G SSID 510, the AP 500 can determine which Wi-Fi slice 515 they belong to and assign the RUs accordingly. If a client device attempts to associate to the 5G SSID 510 but is not permitted to use one of the Wi-Fi slices 515, the AP 500 can reject the association request.

Figure 6:
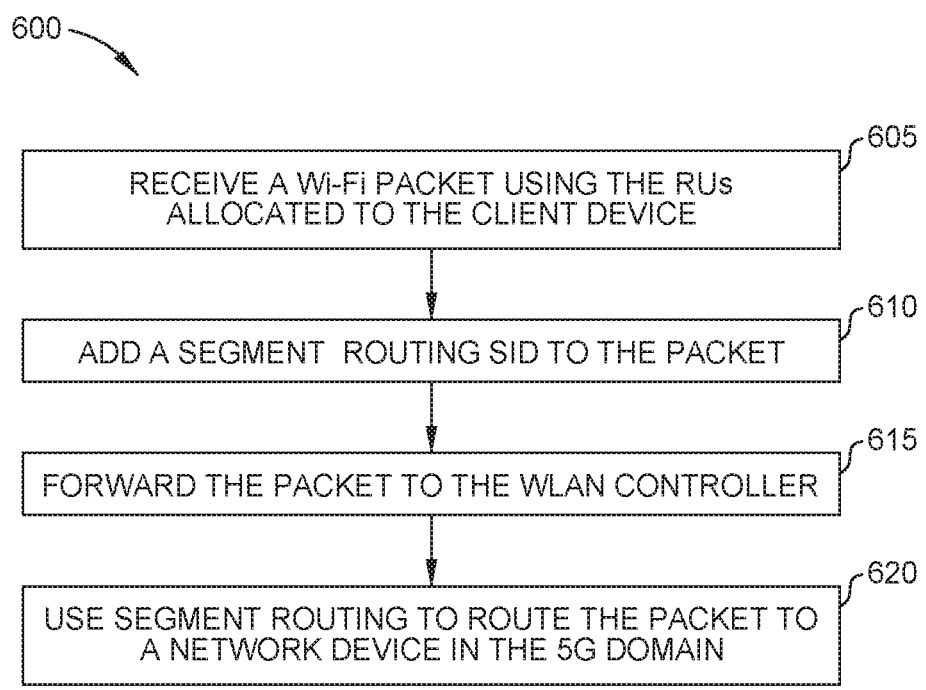
FIG. 6 is a flowchart for transmitting packets received in a Wi-Fi slice to the 5G domain, according to one embodiment.

FIG. 6 is a flowchart of a method 600 for transmitting packets received in a Wi-Fi slice to the 5G domain, according to one embodiment. While the discussion above describes establishing a wireless connection to roaming 5G devices that mirrors the traffic isolation and performance of a 5G slice, the method 600 instead focuses on establishing wired communication between the Wi-Fi domain and the 5G domain.

At block 605, an AP receives a Wi-Fi packet using the RUs allocated to client device after the client devices is associated to the AP. That is, the method 600 assumes that the methods discussed above have already been performed to establish Wi-Fi slices in the APs that mirror the 5G slices. Moreover, the client device has successfully associated to a BSS in the AP and been allocated RUs according to the Wi-Fi slice to which the client device is assigned.

At block 610, the AP adds a segment routing (SR) segment identifier (SID) to the packet. In one embodiment, the SR SID is associated with one of the Wi-Fi slices so that the SR SID identifies which Wi-Fi slice the packet belongs to. While the embodiments herein describe using segment routing, other types of data isolation techniques can be used such as VLANs.

At block 615, the AP forwards the packet (that includes the SR SID) to the WLAN controller. In one embodiment, the AP forwards the packet to the controller using a control and provisioning of wireless access protocols (CAPWAP) tunnel. For example, the AP can add a CAPWAP header to the wireless packet or frame.

At block 620, the Wi-Fi domain uses segment routing to route the packet to a network device in the 5G domain. For example, once the WLAN controller receives the packet or frame, the controller can remove the 802.11ax header and add, e.g., an Ethernet header. The converted Ethernet packet or frame can be re-encapsulated in SR routing so the traffic remains isolated as it traverses network devices until reaching a network device in the 5G domain (e.g., a core router). This tunnel formed using SR is bidirectional so that services or applications in the 5G domain can continue to communicate with the client device using the network devices in the Wi-Fi domain—e.g., APs and the WLAN controller.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   establishing a Wi-Fi slice that mirrors a fifth generation (5G) slice in an access point (AP);
   advertising the Wi-Fi slice to roaming client devices;
   determining that a 5G enabled client device has associated with a basic service set (BSS) corresponding to the Wi-Fi slice; and
   assigning a predetermined number of resource units (RUs) corresponding to the Wi-Fi slice to the 5G enabled client device.

2. The method of claim 1, further comprising, before assigning the predetermined number of RUs to the 5G enabled client device:
   receiving a performance characteristic of the 5G slice in a 5G network; and
   setting a RU allocation assigned to the Wi-Fi slice based on the performance characteristic, wherein the RU allocation determines the predetermined number of RUs.

3. The method of claim 2, wherein the performance characteristic relates to at least one of a maximum latency, minimum bandwidth, or a service level agreement (SLA) of the 5G slice.

4. The method of claim 1, wherein advertising the Wi-Fi slice comprises:
   transmitting a Multiple Basic Service Set Identifier (MBSSID) list in at least one of a beacon corresponding to a service set identifier (SSID) of the AP or a probe response, wherein the MBSSID list comprises information regarding a plurality of Wi-Fi slices and connection information for each of the plurality of Wi-Fi slices.

5. The method of claim 4, wherein the connection information comprises a BSS identifier (ID) for each of the plurality of Wi-Fi slices, wherein one of the BSS IDs is used by the 5G enabled client device when associating with the AP.

6. The method of claim 4, wherein the MBSSID list is advertised using packets corresponding to a SSID that existed on the AP before any Wi-Fi slice was established on the AP.

7. The method of claim 1, further comprising:
   establishing a 5G service set identifiers (SSID) in the AP corresponding to the BSS, wherein the BSS supports at least two Wi-Fi slices having different RU allocations.

8. The method of claim 7, further comprising:
   transmitting beacons corresponding to the 5G SSID and a second SSID, wherein the second SSID existed on the AP before any Wi-Fi slice was established on the AP.

9. An access point (AP), comprising:
   a processor; and
   memory storing a program which, when executed by the processor, performs an operation, the operation comprising:
   establishing a Wi-Fi slice that mirrors a fifth generation (5G) slice in an AP;
   advertising the Wi-Fi slice to roaming client devices;
   determining that a 5G enabled client device has associated with a BSS corresponding to the Wi-Fi slice; and
   assigning a predetermined number of RUs corresponding to the Wi-Fi slice to the 5G enabled client device.

10. The AP of claim 9, wherein the operation further comprises, before assigning the predetermined number of RUs to the 5G enabled client device:
    receiving a performance characteristic of the 5G slice in a 5G network; and
    setting a RU allocation assigned to the Wi-Fi slice based on the performance characteristic, wherein the RU allocation determines the predetermined number of RUs.

11. The AP of claim 10, wherein the performance characteristic relates to at least one of a maximum latency, minimum bandwidth guarantee, or a SLA of the 5G slice.

12. The AP of claim 9, wherein advertising the Wi-Fi slice comprises:
    transmitting a MBSSID list in at least one of a beacon corresponding to a service set identifier (SSID) of the AP or a probe response, wherein the MBSSID list comprises information regarding a plurality of Wi-Fi slices and connection information for each of the plurality of Wi-Fi slices.

13. The AP of claim 12, wherein the connection information comprises a BSS identifier (ID) for each of the plurality of Wi-Fi slices, wherein one of the BSS IDs is used by the 5G enabled client device when associating with the AP.

14. The AP of claim 9, wherein the operation further comprises:
    establishing a 5G service set identifier (SSID) in the AP corresponding to the BSS, wherein the BSS supports at least two Wi-Fi slices having different RU allocations.

15. A non-transitory computer readable medium having program instructions embodied therewith, the program instructions executable by a processor to perform an operation, the operation comprising:
    establishing a Wi-Fi slice that mirrors a fifth generation (5G) slice in an AP;
    advertising the Wi-Fi slice to roaming client devices;
    determining that a 5G enabled client device has associated with a BSS corresponding to the Wi-Fi slice; and
    assigning a predetermined number of RUs corresponding to the Wi-Fi slice to the 5G enabled client device.

16. The non-transitory computer readable medium of claim 15, wherein the operation further comprises, before assigning the predetermined number of RUs to the 5G enabled client device:
    receiving a performance characteristic of the 5G slice in a 5G network; and
    setting a RU allocation assigned to the Wi-Fi slice based on the performance characteristic, wherein the RU allocation determines the predetermined number of RUs.

17. The non-transitory computer readable medium of claim 16, wherein the performance characteristic relates to at least one a maximum latency, minimum bandwidth guarantee, or a SLA of the 5G slice.

18. The non-transitory computer readable medium of claim 15, wherein advertising the Wi-Fi slice comprises:
> transmitting a MBSSID list in at least one of a beacon corresponding to a service set identifier (SSID) of the AP or a probe response, wherein the MBSSID list comprises information regarding a plurality of Wi-Fi slices and connection information for each of the plurality of Wi-Fi slices.

19. The non-transitory computer readable medium of claim 18, wherein the connection information comprises a BSS identifier (ID) for each of the plurality of Wi-Fi slices, wherein one of the BSS IDs is used by the 5G enabled client device when associating with the AP.

20. The non-transitory computer readable medium of claim 15, wherein the operation further comprises:
> establishing a 5G service set identifier (SSID) in the AP corresponding to the BSS, wherein the BSS supports at least two Wi-Fi slices having different RU allocations.

\* \* \* \* \*

UNITED STATES PATENT AND TRADEMARK OFFICE
CERTIFICATE OF CORRECTION

PATENT NO. : 11,252,577 B2
APPLICATION NO. : 16/810602
DATED : February 15, 2022
INVENTOR(S) : Robert E. Barton et al.

It is certified that error appears in the above-identified patent and that said Letters Patent is hereby corrected as shown below:

On the Title Page

On the page 2, in Column 2, item (56) under "Other Publications", Line 3, delete "Confrerence," and insert -- Conference, --.

On the page 2, in Column 2, item (56) under "Other Publications", Line 7, delete "Disclsoure" and insert -- Disclosure --.

In the Claims

In Column 12, Line 66, in Claim 17, delete "one a" and insert -- one of a --.

Signed and Sealed this
Tenth Day of May, 2022

Katherine Kelly Vidal
*Director of the United States Patent and Trademark Office*